United States Patent
Yamakawa et al.

(10) Patent No.: US 9,270,138 B2
(45) Date of Patent: Feb. 23, 2016

(54) ELECTRIC POWER TRANSMISSION SYSTEM

(71) Applicant: EQUOS RESEARCH CO., LTD., Tokyo (JP)

(72) Inventors: Hiroyuki Yamakawa, Hokkaido (JP); Yasuo Ito, Hokkaido (JP); Koki Hayashi, Hokkaido (JP)

(73) Assignee: EQUOS RESEARCH CO., LTD., Tokyo (JP)

( * ) Notice: Subject to any disclaimer, the term of this patent is extended or adjusted under 35 U.S.C. 154(b) by 0 days.

(21) Appl. No.: 14/381,913

(22) PCT Filed: Feb. 27, 2013

(86) PCT No.: PCT/JP2013/055078
§ 371 (c)(1),
(2) Date: Aug. 28, 2014

(87) PCT Pub. No.: WO2013/129452
PCT Pub. Date: Sep. 6, 2013

(65) Prior Publication Data
US 2015/0061580 A1 Mar. 5, 2015

(30) Foreign Application Priority Data
Feb. 29, 2012 (JP) ................................. 2012-044375

(51) Int. Cl.
*H02J 7/00* (2006.01)
*H01F 27/42* (2006.01)
(Continued)

(52) U.S. Cl.
CPC ................ *H02J 7/025* (2013.01); *B60L 11/182* (2013.01); *H01M 10/44* (2013.01); *H01M 10/46* (2013.01);
(Continued)

(58) Field of Classification Search
CPC .......... H04B 5/0037; H02J 7/02; H02J 7/025; H02J 7/0047; B60L 11/182; B60L 11/1838; B60L 11/1818; B60L 11/1846; B60L 11/1862
USPC .......................................... 320/108; 307/104
See application file for complete search history.

(56) References Cited

U.S. PATENT DOCUMENTS 7,812,481 B2 * 10/2010 Iisaka ..................... H02J 7/025
307/104
7,915,858 B2 * 3/2011 Liu ......................... H01F 38/14
320/108
(Continued)

FOREIGN PATENT DOCUMENTS

EP 2328223 A1 6/2011
JP A-2009-501510 1/2009
(Continued)

OTHER PUBLICATIONS

Imura et al., "Transmission Technology Based on Electromagnetic Resonance Coupling," *The Institute of Electrical Engineers of Japan*, 2009, vol. 129 No. 7, pp. 414-417 (with translation).
(Continued)

*Primary Examiner* — M'Baye Diao
(74) *Attorney, Agent, or Firm* — Oliff PLC

(57) ABSTRACT

A power transmission system for transmitting electrical energy from a transmission antenna to a reception antenna via an electromagnetic field, including: an inverter for converting DC voltage into AC voltage having a prescribed frequency and outputting the AC voltage; a transmission-side control unit for performing a control for keeping the drive frequency of the inverter at a prescribed frequency, controlling the voltage of the DC voltage inputted into the inverter, and controlling to keep the power value outputted from the inverter constant; a transmission antenna into which the inverter inputs the AC voltage; a rectifier for rectifying the output from the reception antenna into DC voltage; a step-up/step-down unit for stepping up or down and then outputting the DC voltage from the rectifier; a battery charged by the output from the step-up/step-down unit; and a reception-side control unit for controlling the step-up/step-down unit and charging the battery most efficiently.

4 Claims, 10 Drawing Sheets

(51) Int. Cl.
*H02J 7/02* (2006.01)
*H01M 10/44* (2006.01)
*H01M 10/46* (2006.01)
*B60L 11/18* (2006.01)
*H02J 7/04* (2006.01)
*B60M 7/00* (2006.01)
*H01M 10/42* (2006.01)

(52) U.S. Cl.
CPC . *H02J 7/04* (2013.01); *B60M 7/003* (2013.01); *H01M 2010/4278* (2013.01); *H02J 2007/0096* (2013.01); *Y02T 10/7005* (2013.01); *Y02T 90/122* (2013.01); *Y02T 90/14* (2013.01)

(56) References Cited

U.S. PATENT DOCUMENTS

| | | | | |
|---|---|---|---|---|
| 8,111,041 | B2* | 2/2012 | Onishi | H02J 5/005 320/106 |
| 8,491,159 | B2* | 7/2013 | Recker | H02J 9/02 362/20 |
| 8,922,066 | B2* | 12/2014 | Kesler | H02H 11/00 307/104 |
| 9,065,423 | B2* | 6/2015 | Ganem | H03H 7/40 |
| 2009/0026844 | A1* | 1/2009 | Iisaka | H02J 7/025 307/104 |
| 2010/0244578 | A1 | 9/2010 | Yoshikawa | |
| 2011/0181240 | A1* | 7/2011 | Baarman | B60L 11/182 320/108 |
| 2012/0146580 | A1* | 6/2012 | Kitamura | H01F 38/14 320/108 |
| 2012/0200151 | A1* | 8/2012 | Obayashi | B60L 11/123 307/9.1 |
| 2013/0293432 | A1* | 11/2013 | Kawahata | H04B 1/0458 343/745 |
| 2015/0001958 | A1* | 1/2015 | Abe | H02J 5/005 307/104 |

FOREIGN PATENT DOCUMENTS

| | | |
|---|---|---|
| JP | A-2010-68657 | 3/2010 |
| JP | A-2010-233364 | 10/2010 |
| JP | A-2013-17254 | 1/2013 |
| JP | A-2013-78171 | 4/2013 |
| WO | WO 2007/008646 A2 | 1/2007 |
| WO | 2009/081115 A1 | 7/2009 |
| WO | 2011/086445 A2 | 7/2011 |

OTHER PUBLICATIONS

Imura et al., "Study of Magnetic and Electric Coupling for Contactless Power Transfer Using Equivalent Circuits," *The Institute of Electrical Engineers of Japan*, 2010, vol. 130 No. 1, pp. 84-92 (with partial translation).

International Search Report issued in PCT/JP2013/055078 mailed May 21, 2013.

International Preliminary Report on Patentability issued in PCT/JP2013/055078 issued Sep. 2, 2014.

Yusuke Moriwaki et al.: "Basic study on reduction of reflected power using DC/DC converters in wireless power transfer system via magnetic resonant coupling", Tellecommunications Energy Conference (Intelect), 2011 IEEE 33rd International IEE, Oct. 9, 2011, pp. 1-5.

Teckchuan Beh et al. "Wireless Power Transfer System via Magnetic Resonant Coupling at Fixed Resonance Frequency—Power Transfer System Based on Impedance Matching—EVS25 World Battery, Hybrid and Fuel Cell Electric Vehicle Symposium." World Electric Vehicle Journal, vol. 4, Sep. 5, 2010, pp. 744-753.

\* cited by examiner

Diagram showing charging profile of battery

Positional change: Positional change between two antennas from optimum relative position Schematic diagram showing state of current and magnetic fields
at first extreme-value frequency Schematic diagram showing state of current and magnetic fields
at second extreme-value frequency (A)

(B)

ELECTRIC POWER TRANSMISSION SYSTEM

TECHNICAL FIELD

The present invention relates to a wireless electric power transmission system that uses a magnetic resonance antenna of a magnetic resonance method.

BACKGROUND ART

In recent years, development of technology for wirelessly transmitting electric power (electric energy) without using power supply cords and the like has become popular. Among methods for wirelessly transmitting electric power, the technique called a magnetic resonance method is gaining particular attention. The magnetic resonance method was proposed by a research group at the Massachusetts Institute of Technology in 2007. The related technology is disclosed in Patent Document 1 (Japanese PCT National Publication No. 2009-501510), for example.

In a wireless electric power transmission system of the magnetic resonance method, a resonance frequency of a power transmission antenna is equal to a resonance frequency of a power receiving antenna. Therefore, from the power transmission antenna to the power receiving antenna, energy can be efficiently transmitted. One of major features is that the power transmission distance can be from several tens of centimeters to several meters.

In the above wireless electric power transmission system of the magnetic resonance method, if one of the antennas is mounted on a moving object such as an electric vehicle, the arrangement of the antennas would change each time the transmission of electric power is carried out. Accordingly, the frequency that gives an optimum electric power transmission efficiency would vary. Therefore, what is proposed is a technique for determining an optimum frequency for actual transmission of charging power by sweeping frequencies before the transmission of electric power takes place. For example, what is disclosed in Patent Document 1 (JP2010-68657A) is: a wireless electric power transmission device, which includes AC power output means for outputting AC power of a predetermined frequency, a first resonance coil, and a second resonance coil that is disposed in such a way as to face the first resonance coil and in which AC power output from the AC power output means is output to the first resonance coil and the AC power is transmitted to the second resonance coil in a non-contact manner through resonance phenomena, is characterized by including frequency setting means for measuring a resonance frequency of the first resonance coil and a resonance frequency of the second resonance coil and setting the frequency of the AC power output from the AC power output means to an intermediate frequency of the resonance frequencies.

Patent Document 1: Japanese PCT National Publication No. 2009-501510
Patent Document 2: JP2010-68657A

SUMMARY OF THE INVENTION

Problems to be Solved by the Invention

However, in the conventional magnetic resonance-type wireless electric power transmission system, the problem is that complex circuits and the like are required to determine an optimum frequency for actual transmission of charging power by sweeping frequencies before the transmission of electric power takes place, contributing to an increase in costs of the system.

Means for Solving the Problems

To solve the above problems, according to the invention of claim 1, an electric power transmission system, which transmits electric energy via an electromagnetic field from a power transmission antenna to a power receiving antenna, is characterized by including: an inverter unit that converts DC voltage to AC voltage of a predetermined frequency to output; a power transmission-side control unit that controls a drive frequency of the inverter unit and a voltage value of DC voltage input to the inverter unit, and controls power output from the inverter unit; the power transmission antenna to which AC voltage is input from the inverter unit; a rectifying unit that rectifies an output of the power receiving antenna to obtain DC voltage, and outputs the DC voltage; a step-up and step-down unit that steps up or down DC voltage output from the rectifying unit to output; a battery that is charged with an output of the step-up and step-down unit; and a power receiving-side control unit that controls the step-up and step-down unit in such a way as to charge the battery with maximum efficiency, and thereby controls in such a way that the drive frequency of the inverter unit remains unchanged regardless of a coupling coefficient between the power transmission antenna and the power receiving antenna.

According to the invention of claim 2, the electric power transmission system of claim 1 is characterized in that: the power transmission-side control unit controls in such a way as to keep the drive frequency of the inverter unit at a predetermined frequency; and the power receiving-side control unit controls the step-up and step-down unit in such a way as to charge the battery with a maximum power value.

According to the invention of claim 3, the electric power transmission system of claim 1 or 2 is characterized in that, as the drive frequency of the inverter unit, a higher extreme-value frequency is used out of two extreme-value frequencies.

Advantages of the Invention

In the electric power transmission system of the present invention, a power transmission-side system controls in such away as to keep a drive frequency of the inverter unit at a predetermined frequency; a power receiving-side system charges the battery with maximum efficiency. In this manner, the electric power transmission system controls in such a way that the drive frequency of the inverter unit remains unchanged regardless of a coupling coefficient between the power transmission antenna and the power receiving antenna. As a result, the transmission of electric power can be performed under an optimum load condition corresponding to a positional change between the power transmission antenna and the power receiving antenna. Moreover, complex circuits are not required to determine an optimum frequency for actual transmission of charging power by sweeping frequencies. Therefore, the system can be built at low cost. Moreover, the power transmission-side system can keep a change in the drive frequency small even if one or a plurality of points exist as drive frequencies. Therefore, the configuration of the system can be simplified.

MODE FOR CARRYING OUT THE INVENTION

Figure 1:
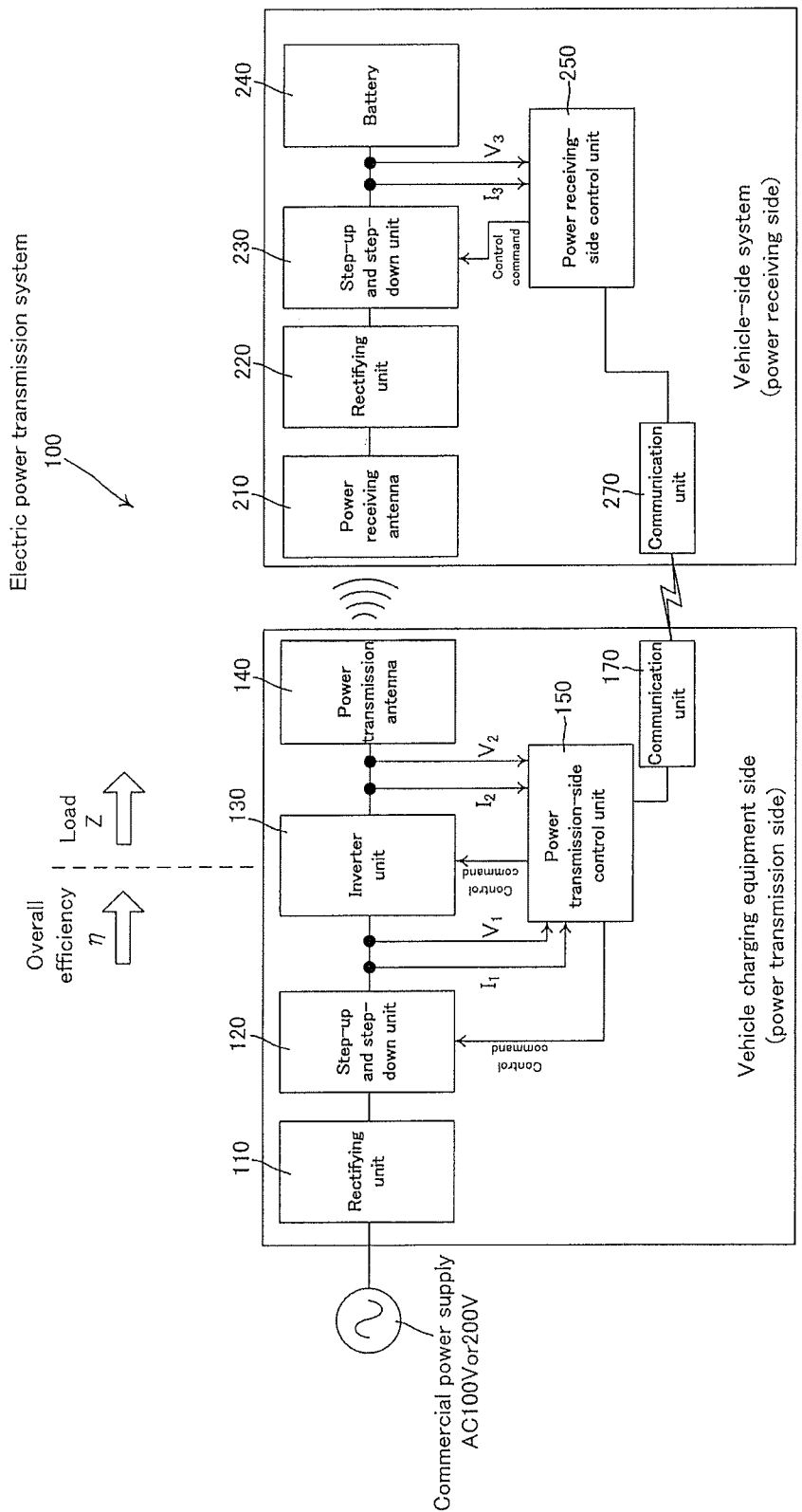
FIG. 1 is a block diagram of an electric power transmission system according to an embodiment of the present invention.
Figure 2:
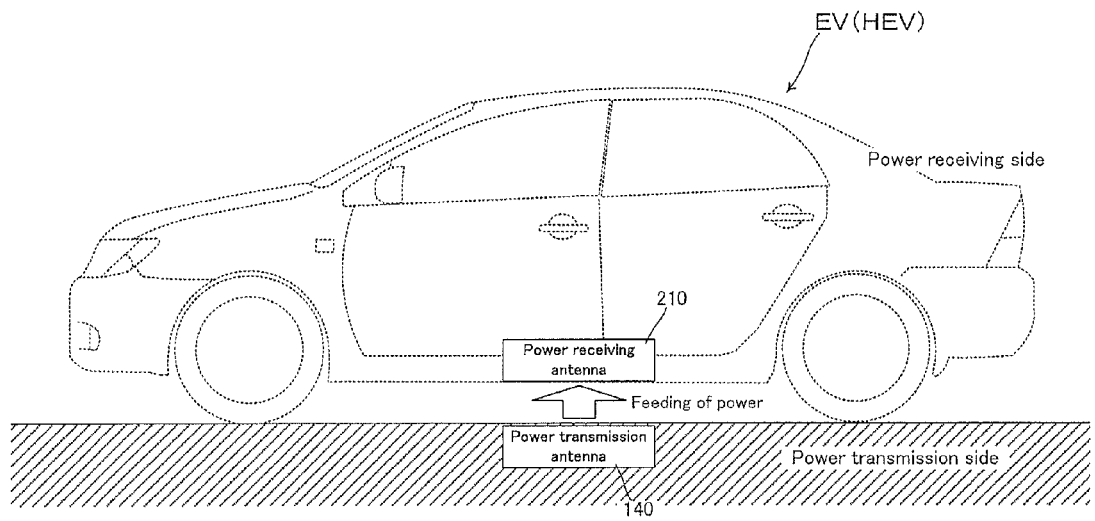
FIG. 2 is a schematic diagram showing an example in which an electric power transmission system of an embodiment of the present invention is mounted on a vehicle.

Hereinafter, an embodiment of the present invention will be described with reference to the accompanying drawings. FIG. 1 is a block diagram of an electric power transmission system according to an embodiment of the present invention. FIG. 2 is a schematic diagram showing an example in which an electric power transmission system 100 of the embodiment of the present invention is mounted on a vehicle. The electric power transmission system 100 of the present invention is suitably used in a system that charges vehicle-mounted batteries, such as those of an electric vehicle (EV) or a hybrid electric vehicle (HEV), for example. For that purpose, on a bottom portion of a vehicle, a power receiving antenna 210 is placed to make it possible to receive electric power.

In the electric power transmission system 100 of the present embodiment, electric power is transmitted to the above vehicle in a non-contact manner. The power transmission system 100 is therefore provided in a parking space where the vehicle can be stopped. In the parking space, which is a vehicle-charging space, a power transmission antenna 140 and other components of the electric power transmission system 100 of the present embodiment are buried under the ground. A user of the vehicle parks the vehicle in the parking space in which the electric power transmission system of the present embodiment is provided. Electric energy is transmitted from the power transmission antenna 140 to the power receiving antenna 210, which is mounted on the vehicle, via electromagnetic fields.

The electric power transmission system 100 of the present embodiment is used as described above. Therefore, the positional relationship between the power transmission antenna 140 and the power receiving antenna 210 changes each time the vehicle is parked in the parking space, and a frequency that gives an optimum electric power transmission efficiency would change accordingly. Therefore, after the vehicle is parked, or after the positional relationship between the power transmission antenna 140 and the power receiving antenna 210 is fixed, an optimum frequency is determined based on the relationship between the phase of voltage input to the power transmission antenna and the phase of current before the transmission of charging power actually takes place.

In vehicle charging equipment (power transmission side), a rectifying unit 110 is a converter that converts AC voltage from commercial power supply into a constant level of DC voltage. The DC voltage from the rectifying unit 110 is input to a step-up and step-down unit 120. The step-up and step-down unit 120 steps up or down the DC voltage to a desired voltage value. A power transmission-side control unit 150 can control how to set the value of the voltage output from the step-up and step-down unit 120.

Figure 3:
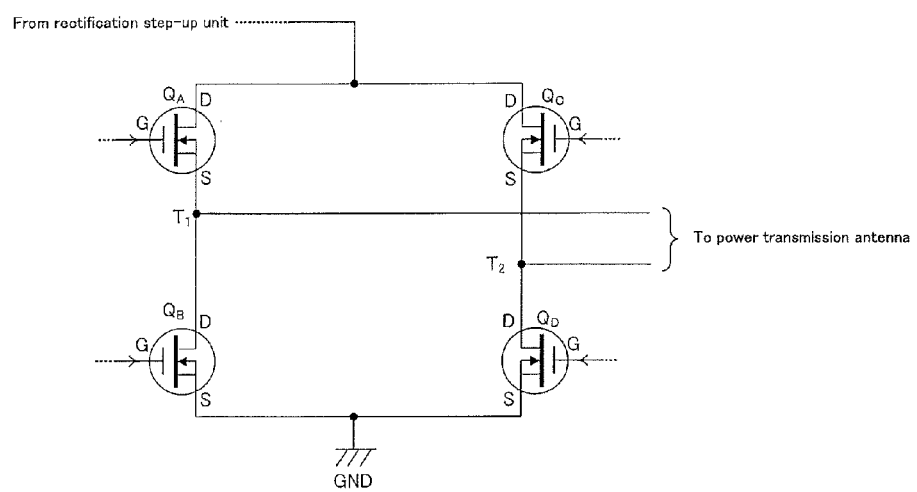
FIG. 3 is a diagram showing an inverter unit of an electric power transmission system of an embodiment of the present invention.

An inverter unit 130 generates, from the DC voltage supplied from the step-up and step-down unit 120, a predetermined level of AC voltage to input to the power transmission antenna 140. FIG. 3 is a diagram showing the inverter unit of the electric power transmission system of the embodiment of the present invention. As shown in FIG. 3, for example, the inverter unit 130 includes four field-effect transistors (FET) $Q_A$ to $Q_D$, which are connected in full-bridge configuration.

According to the present embodiment, between a connection portion T1, which is located between the switching elements $Q_A$ and $Q_B$ connected in series, and a connection portion T2, which is located between the switching elements $Q_C$ and $Q_D$ connected in series, the power transmission antenna 140 is connected. When the switching elements $Q_A$ and $Q_D$ are ON, the switching elements $Q_B$, and $Q_C$ are OFF. When the witching elements $Q_B$ and $Q_C$ are ON, the switching elements $Q_A$ and $Q_D$ are OFF. As a result, a rectangular wave of AC voltage is generated between the connection portions T1 and T2.

To the switching elements $Q_A$ to $Q_D$ that make up the above inverter unit 130, a drive signal is input from the power transmission-side control unit 150. Moreover, the frequency for driving the inverter unit 130 can be controlled from the power transmission-side control unit 150.

The output of the above inverter unit 130 is supplied to the power transmission antenna 140. The power transmission antenna 140 includes a coil having an inductance component, and resonates with the vehicle-mounted power receiving antenna 210, which is disposed in such a way as to face the power transmission antenna 140. In this manner, electric energy output from the power transmission antenna 140 can be transmitted to the power receiving antenna 210.

Incidentally, when the output of the inverter unit 130 is input to the power transmission antenna 140, impedance matching may be carried out by a matching unit, which is not shown in the diagrams. The matching unit may include a passive element having a predetermined circuit constant.

In the electric power transmission system of the embodiment of the present invention, when power is efficiently transmitted from the power transmission-side power transmission antenna 140 of the electric power transmission system 100 to the power receiving-side power receiving antenna 210, a resonance frequency of the power transmission antenna 140 becomes equal to a resonance frequency of the power receiving antenna 210. Therefore, from the power transmission antenna to the power receiving antenna, energy is efficiently transmitted.

Voltage $V_1$ and current $I_1$, which are input to the inverter unit 130, and voltage $V_2$ and current $I_2$, which are output from the inverter unit 130, are measured by the power transmission-side control unit 150. The power transmission-side control unit 150 can acquire information, such as input power ($W_1=V_1 \times I_1$) input to the inverter unit 130 and output power ($W_2=V_2 \times I_2$) output from the inverter unit 130, from the measured voltage $V_1$ and current $I_1$ and the measured voltage $V_2$ and current $I_2$.

The power transmission-side control unit 150 has the above configuration, and therefore can detect the phase of voltage $V_2$ output from the inverter unit 130 and the phase of current $I_2$.

The power transmission-side control unit 150 includes a general-purpose information processing unit that includes a CPU, a ROM, which keeps programs that run on the CPU, a RAM, which serves as a work area for the CPU, and the like. The power transmission-side control unit 150 calculates a difference in phase between the detected voltage $V_2$ and current $I_2$.

The power transmission-side control unit 150 performs the actual transmission of charging power by controlling the voltage of the DC voltage output from the step-up and step-down unit 120 and the frequency of the AC voltage output from the inverter unit 130. During such a control process, the frequency and the like are determined by referencing a control program stored in the power transmission-side control unit 150. The control program is stored in a storage means, and a calculation unit of the power transmission-side control unit 150 is so configured as to be able to reference the control program.

Moreover, a communication unit 170 wirelessly communicates with a vehicle-side communication unit 270 so the transmitting and receiving of data is possible between the power transmission side and the vehicle. The data received by the communication unit 170 is transferred to the power transmission-side control unit 150, in which the data is processed. The power transmission-side control unit 150 is able to transmit predetermined information to the vehicle side via the communication unit 170.

The configuration of the electric power transmission system 100 provided on the vehicle side will be described. In the vehicle's electric power receiving system, the power receiving antenna 210 is designed to resonate with the power transmission antenna 140 to receive electric energy output from the power transmission antenna 140.

The AC power received by the power receiving antenna 210 is rectified by a rectifying unit 220. The output of the rectifying unit 220 is stepped up or down by a step-up and step-down unit 230 to a predetermined voltage value, and is accumulated in a battery 240. The step-up and step-down unit 230 controls a process of charging the battery 240 on the basis of a command from a power receiving-side control unit 250.

Voltage $V_3$ and current $I_3$, which are input to the battery 240 from the step-up and step-down unit 230, are measured by the power receiving-side control unit 250. Based on the measured voltage $V_3$ and current $I_3$, the power receiving-side control unit 250 controls the step-up and step-down unit 230, and thereby controls the process of charging the battery 240 in such a way as to follow an appropriate charging profile of the battery 240. The step-up and step-down unit 230 includes a current sensor and a voltage sensor; the step-up and step-down unit 230 can select one of charging modes, i.e., a constant current charging mode, a constant power charging mode, or a constant voltage charging mode, to charge the battery 240 by conducting feedback control of an output voltage. As described later, in the constant current charging mode, power maximization control of charging power for the battery 240 can be performed.

The power receiving-side control unit 250 includes a general-purpose information processing unit that includes a CPU, a ROM, which keeps programs that run on the CPU, a RAM, which serves as a work area for the CPU, and the like. The power receiving-side control unit 250 works cooperatively with each of components connected to the power receiving-side control unit 250 shown in the diagrams.

Figure 4:
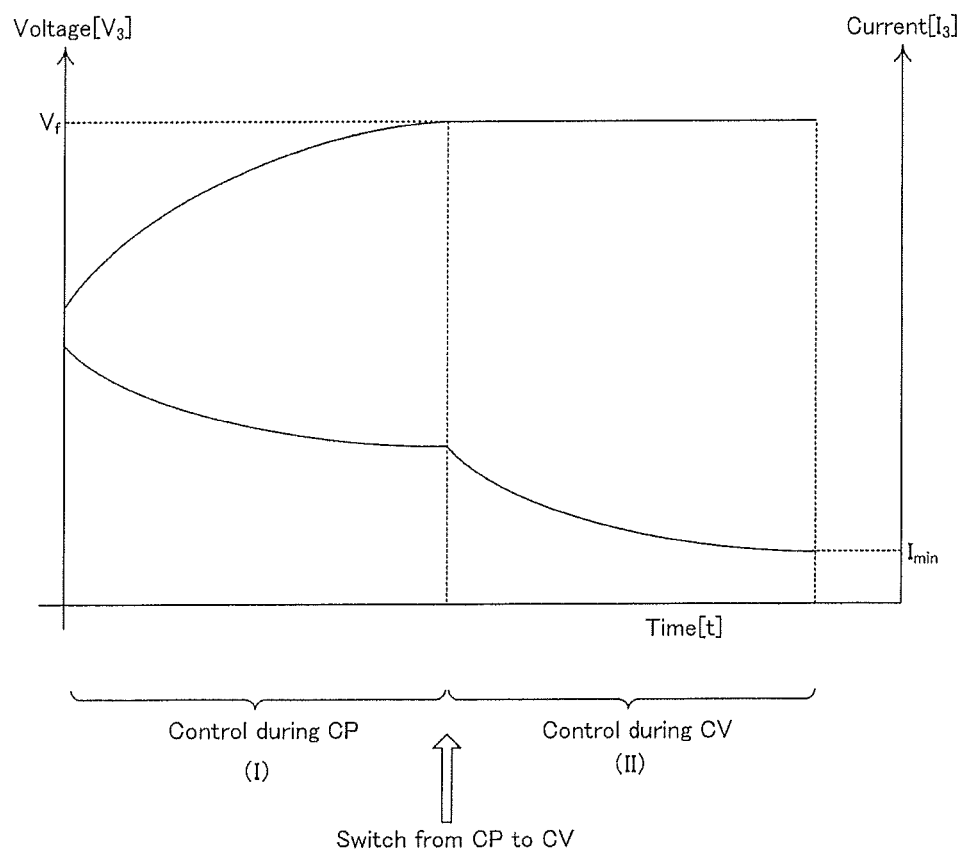
FIG. 4 is a diagram showing a charging profile of a battery.

In the power receiving-side control unit 250, the charging profile of the battery 240 is stored, and algorithm for letting the power receiving-side control unit 250 operate in accordance with the profile is stored, too. FIG. 4 is a diagram showing a charging profile 260 of the battery 240. The charging profile 260 is one example of charging profiles for the battery 240. In charging the battery 240, other profiles may be used.

The charging profile shown in FIG. 4 is used when the amount of electricity stored in the battery 240 is almost zero. According to this charging profile, at first, constant output charging (CP control) is carried out to charge the battery 240 with a constant level of power $P_{const}$. Then, after an end-portion voltage of the battery 240 reaches Vf, constant voltage charging (CV control) is carried out in such a way as to keep a constant level of charging voltage. After the current that flows into the battery 240 reaches $I_{min}$ during the constant voltage charging, the charging comes to an end.

The communication unit 270 wirelessly communicates with the communication unit 170 of the vehicle charging equipment side so the transmitting and receiving of data is possible between the power transmission-side system and the vehicle-side system. The data received by the communication unit 270 is transferred to the power receiving-side control unit 250, in which the data is processed. The power receiving-side control unit 250 is able to transmit predetermined information to the power transmission side via the communication unit 270. For example, the power receiving-side control unit 250 is able to transmit, to the vehicle charging equipment-side system, information about which charging mode, i.e., a constant power (CP) charging mode or a constant voltage (CV) charging mode, is being used to charge the battery 240.

As described above, in the electric power transmission system 100 of the present embodiment, when actual transmission of charging power is carried out after the positional relationship between the power transmission antenna 140 and the power receiving antenna 210 is fixed, the power transmission antenna 140 is driven at a constant, fixed frequency that has been set, instead of selecting an optimum frequency by sweeping frequencies, and, through adjusting of the step-up and step-down unit 230 in the power receiving-side system, an optimum transmission efficiency is obtained.

Figure 5:
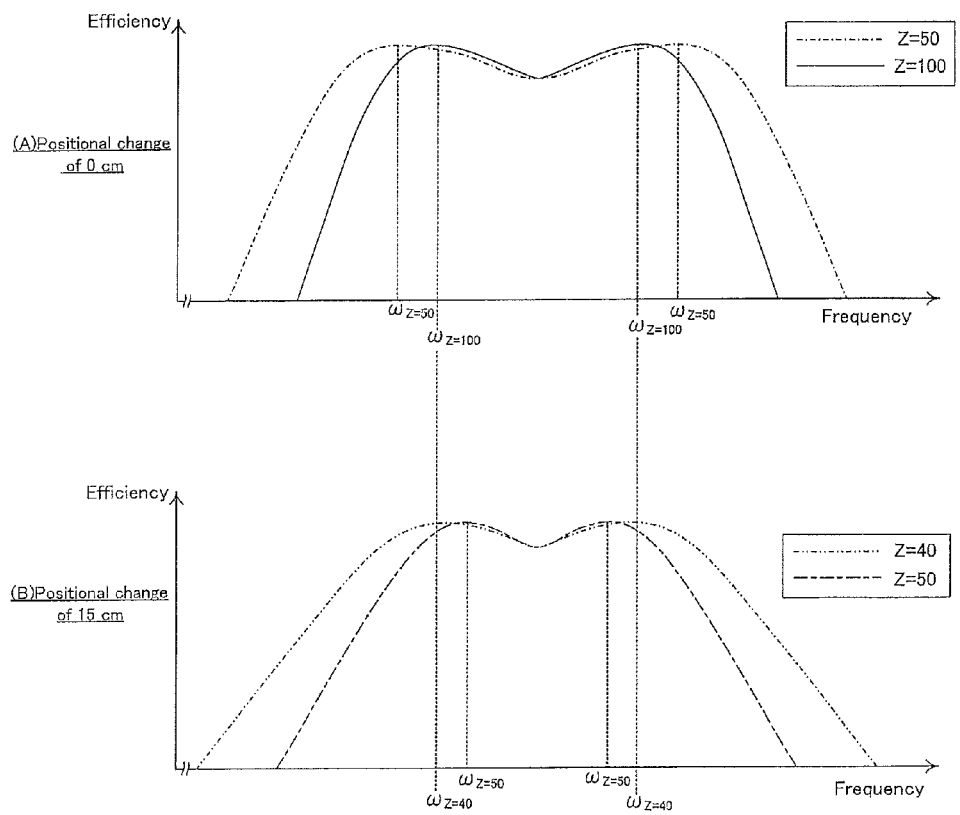
FIG. 5 is results of experiments showing that the relationship between load conditions and overall efficiency changes according to a positional change between a power transmission antenna 140 and a power receiving antenna 210.
Figure 6:
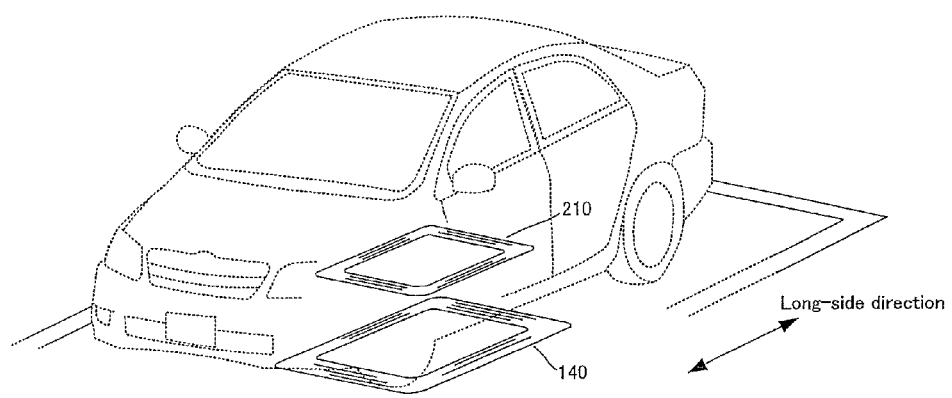
FIG. 6 is a diagram illustrating definitions of positional relationship between the power transmission antenna 140 and the power receiving antenna 210.

FIG. 5 is results of experiments showing that the relationship between load conditions and overall efficiency changes according to a positional change between the power transmission antenna 140 and the power receiving antenna 210. FIG. 6 is a diagram illustrating definitions of positional relationship between the power transmission antenna 140 and the power receiving antenna 210.

Both the power transmission antenna 140 and the power receiving antenna 210 are a substantially rectangular coil that is wound in a spiral shape. Under restriction, which means the power receiving antenna 210 is mounted on the vehicle, the relative position of the power transmission antenna 140 to the power receiving antenna 210 where a coupling coefficient between the power transmission antenna 140 and the power receiving antenna 210 is maximized is defined as an optimum relative position. In this case, a positional change between the power transmission antenna 140 and the power receiving antenna 210 can be defined as a deviation from the optimum relative position. As the positional change between the antennas relative to the optimum relative position becomes larger, the coupling coefficient becomes smaller.

FIG. 5(A) schematically shows frequency characteristics of efficiency with a positional change of 0 cm, when the impedance of the load is set to 50Ω and when the impedance of the load is set to 100Ω. FIG. 5(B) schematically shows frequency characteristics of efficiency with a positional change of 15 cm, when the impedance of the load is set to 40Ω and when the impedance of the load is set to 50Ω. In this case, the load represents Z in FIG. 1. The efficiency in the overall efficiency means the efficiency seen from η in FIG. 1. In FIG. 5, the value indicated by $\omega_{z=100}$ means the frequency that yields maximum efficiency when the impedance is 100Ω.

From FIG. 5, it is clear that, even if the positional relationship between the power transmission antenna 140 and the power receiving antenna 210 is changed, the frequency that yields maximum efficiency for the entire system can be kept at a constant level by changing the impedance of the load.

Accordingly, in the electric power transmission system of the present invention, the power transmission-side system controls in such a way as to keep the drive frequency of the inverter unit 130 at a predetermined frequency, and the power receiving-side system controls in such a way as to receive electric power as maximum electric power.

More specifically, in the electric power transmission system of the present invention, the power transmission-side system controls in such a way as to keep the drive frequency of the inverter unit 130 at a predetermined frequency, and the power receiving-side system charges the battery 240 with maximum efficiency. In this manner, the electric power transmission system controls in such a way that the drive frequency of the inverter unit 130 remains unchanged regardless of the coupling coefficient between the power transmission antenna 140 and the power receiving antenna 210.

As a result, even if a positional change occurs between the power receiving antenna and the power transmission antenna, an optimum frequency is not selected by sweeping frequencies before the transmission of electric power takes place. Instead, by simply changing the output of the step-up and step-down unit 230 of the power receiving-side system to change and adjust the load, optimum transmission of electric power can be performed.

The flow of a control process of the inverter unit 130 in the electric power transmission system 100 having the above configuration will be described.

Figure 7:
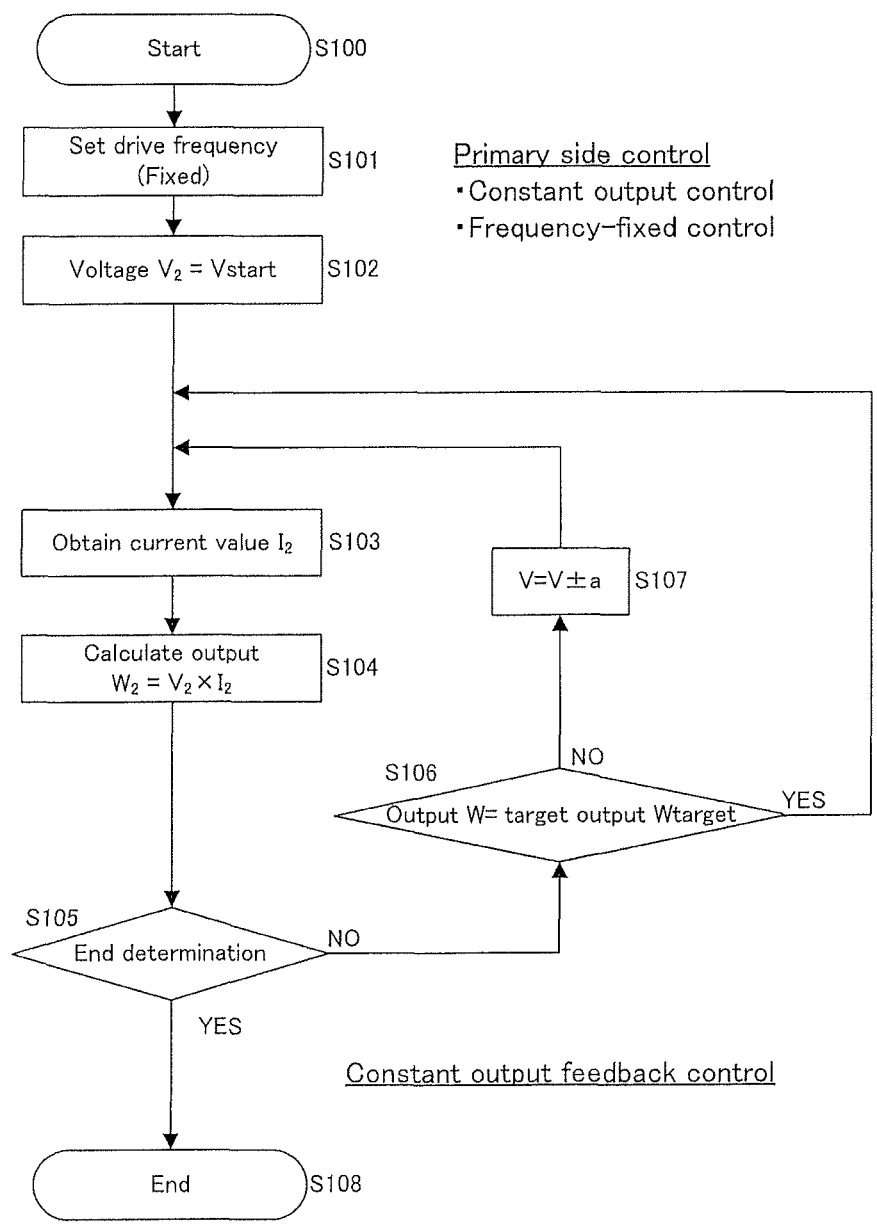
FIG. 7 is a diagram showing a flowchart of a control process in a power transmission-side system of an electric power transmission system according to an embodiment of the present invention.

FIG. 7 is a diagram showing a flowchart of a control process in the power transmission-side system of the electric power transmission system according to the embodiment of the present invention.

In FIG. 7, at step S100, the process starts. At step S101, the drive frequency of the inverter unit 130 is fixed and set to a predetermined frequency. At step S102, voltage $V_2$ is set to initial voltage $V_{start}$.

At step S103, current value $I_2$ is obtained. At step S104, output power is calculated: $W_2=V_2 \times I_2$.

At step S105, a determination is made as to whether or not the transmission of electric power ends. When the determination result is NO, the process proceeds to step S06. When the determination result is YES, the process proceeds to step S108 and ends.

At step S106, a determination is made as to whether or not the output power W has reached target output power $W_{target}$. When the determination result is YES, the process proceeds to step S102. When the determination result is NO, the voltage $V_2$ is stepped up or down, or adjusted, at step S107.

Figure 8:
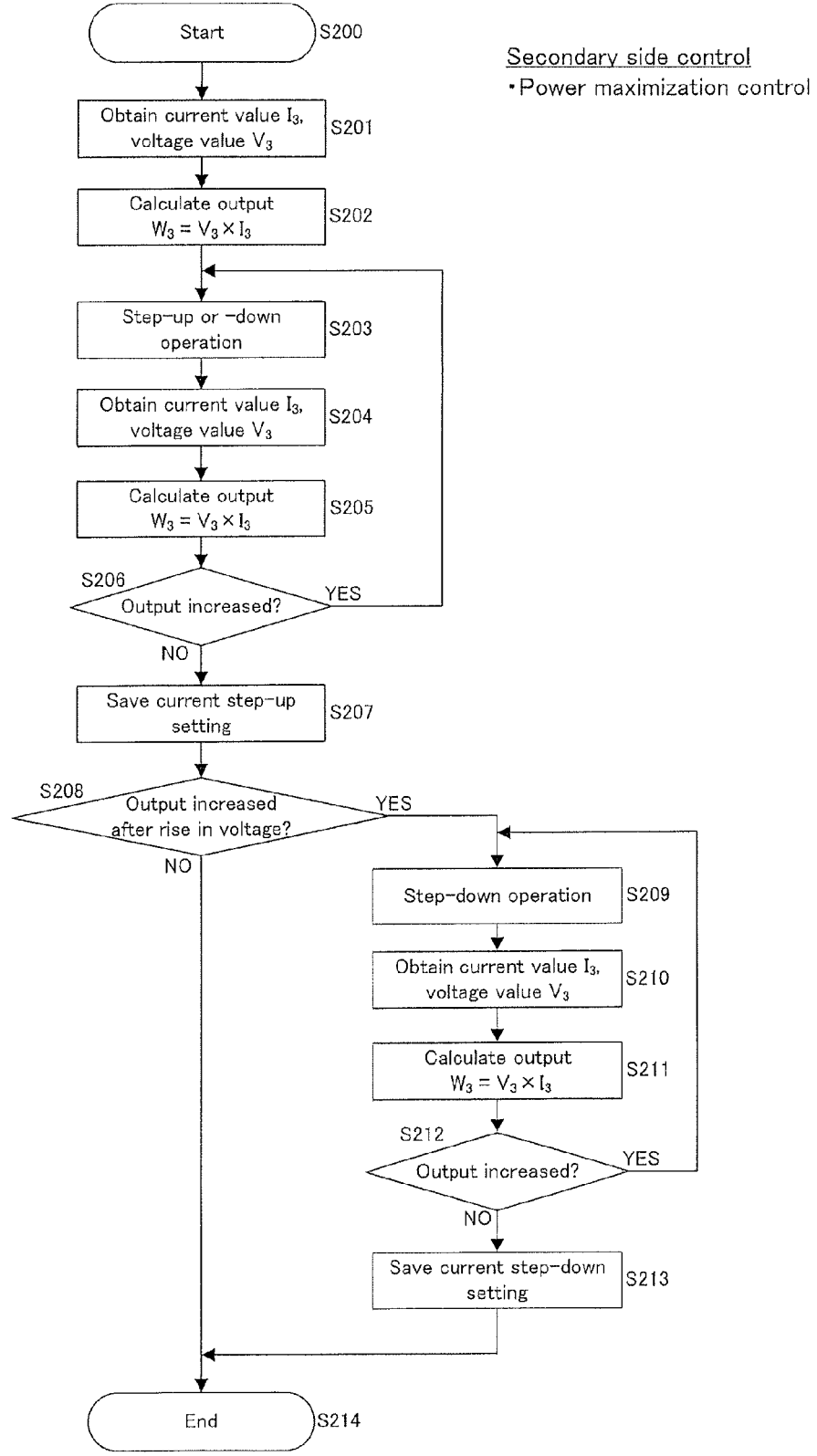
FIG. 8 is a diagram showing a flowchart of a control process in a power receiving-side system of an electric power transmission system according to an embodiment of the present invention.

The following describes power maximization control by the power receiving-side system for the above power transmission-side system. In the power receiving-side system, in order to receive maximized power, the algorithm is so designed that the step-up and step-down unit 230 is optimally operated to charge the battery, or the load of the power receiving side, with maximum efficiency. In short, the step-up and step-down unit 230 is controlled in such a way that the power that charges the battery 240 is maximized. Therefore, the flowchart shown in FIG. 8 is one example of such control. Since the step-up and step-down unit 230 is connected to the battery 240, the voltage $V_3$ measured by the power receiving-side control unit 250 is determined based on the state of the battery 240. Accordingly, the step-up and step-down operation of the step-up and step-down unit 230 is not observed as a change in the voltage $V_3$ in a short time-frame, but is observed as current $I_3$. However, a change in the voltage $V_3$ occurs over the entire charging time. Therefore, it is desirable that $W_3$, which is the product of those values, should be observed.

FIG. 8 is a diagram showing a flowchart of a control process in the power receiving-side system of the electric power transmission system according to the embodiment of the present invention.

In FIG. 8, at step S200, the process starts. Then, at step S201, current value $I_3$ and voltage value $V_3$ are obtained. At step S202, the power output from the step-up and step-down unit 230 is calculated: $W_3=V_3 \times I_3$.

Then, at step S203, the step-up operation of the step-up and step-down unit 230 is carried out. At step S204, current value $I_3$ and voltage value $V_3$ are obtained. At step S205, the power output from the step-up and step-down unit 230 is calculated: $W_3=V_3 \times I_3$. In this case, the step-up operation is an operation in which the step-up and step-down unit 230 can increase the output voltage $V_3$ if the battery 240 is not connected.

At step S206, a determination is made as to whether or not the output power has increased. When the determination result is YES, the process goes back to step S203. When the determination result is NO, the process proceeds to step S207.

At step S207, a current step-up setting value is set in the step-up and step-down unit 230 as a value for giving maximum output.

Furthermore, at step S208, a determination is made as to whether or not the output power has increased during the operation through S206. When the determination result is YES, the process proceeds to step S209. When the determination result is NO, the process proceeds to step S214 and ends.

At step S209, the step-down operation of the step-up and step-down unit 230 is carried out. Then, at step S210, current value $I_3$ and voltage value $V_3$ are obtained. At step S211, the power output from the step-up and step-down unit 230 is calculated: $W_3=V_3 \times I_3$. In this case, the step-down operation is an operation in which the step-up and step-down unit 230 can decrease the output voltage $V_3$ if the battery 240 is not connected.

At step S212, a determination is made as to whether or not the output power has increased. When the determination result is YES, the process goes back to step S209. When the determination result is NO, the process proceeds to step S213. At step S213, a current step-down setting value is set in the step-up and step-down unit 230 as a value for giving maximum output. Then, the process proceeds to step S214 and ends. The step-up setting value and the step-down setting value are exclusively adopted. After the step-down setting value is set, the step-up setting value, which is set at step S207, is not used.

As described above, in the electric power transmission system of the present invention, the power transmission-side system controls in such a way as to keep the drive frequency of the inverter unit at a predetermined frequency, and the power receiving-side system controls in such a way as to receive electric power as maximum electric power. As a result, the transmission of electric power is performed under an optimum load condition corresponding to a positional change between the power transmission antenna and the power receiving antenna. Moreover, there is no need for complex circuits that determine an optimum frequency for actual transmission of charging power by sweeping frequencies. Therefore, the system can be built at low cost. Moreover, the power transmission-side system can keep a change in the drive frequency small even if one or a plurality of points exist as drive frequencies. Therefore, the configuration of the system can be simplified.

Frequencies that give extreme values of transmission efficiency in the wireless electric power transmission system will be described. During the power transmission of the system, there might be two frequencies that give extreme values of transmission efficiency. The following describes how to select an optimal one for the system out of the two frequencies.

Figure 9:
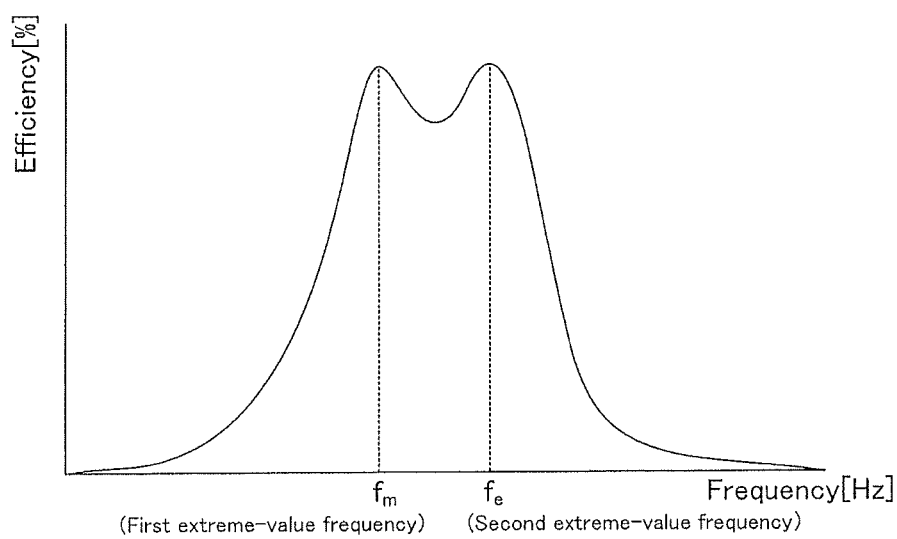
FIG. 9 is a diagram showing an example of frequency dependence of power transmission efficiency when the power transmission antenna 140 and the power receiving antenna 210 are placed close to each other.

FIG. 9 is a diagram showing an example of frequency dependence of transmission efficiency when the power transmission antenna 140 and the power receiving antenna 210 are placed close to each other.

In the wireless electric power transmission system of the magnetic resonance method, as shown in FIG. 9, there are two frequencies, a first extreme-value frequency $f_m$ and a second extreme-value frequency $f_e$. When the transmission of electric power is performed, one of the frequencies is preferably used.

Figure 10:
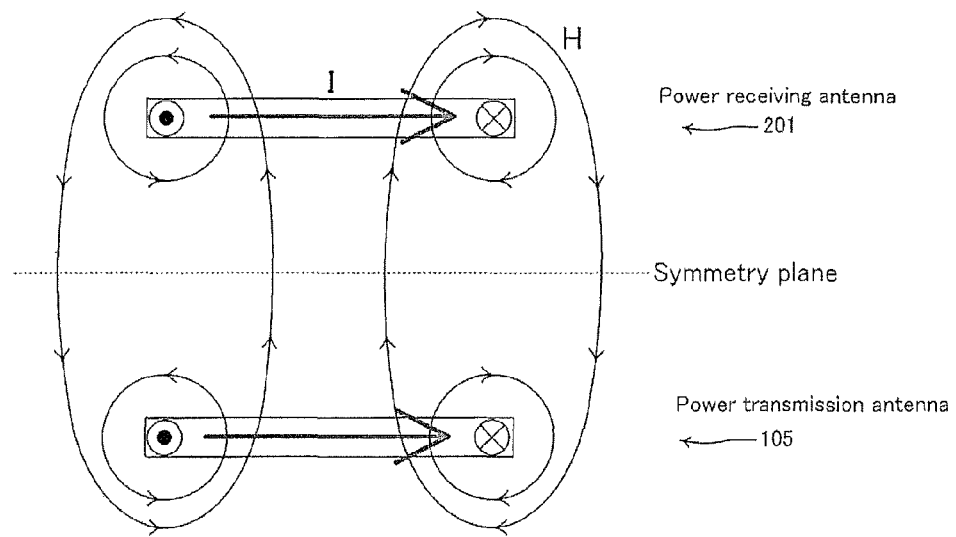
FIG. 10 is a schematic diagram showing the state of current and electric fields at a first extreme-value frequency.

FIG. 10 is a schematic diagram showing the state of current and electric fields at a first extreme-value frequency. At the first extreme-value frequency, the phase of current flowing through a coil of the power transmission antenna 140 is substantially equal to the phase of current flowing through a coil of the power receiving antenna 210. The vectors of magnetic fields are aligned at around a middle point of the coil of the power transmission antenna 140 and of the coil of the power receiving antenna 210. This state is regarded as generating a magnetic wall whose magnetic field is perpendicular to a symmetry plane located between the power transmission antenna 140 and the power receiving antenna 210.

Figure 11:
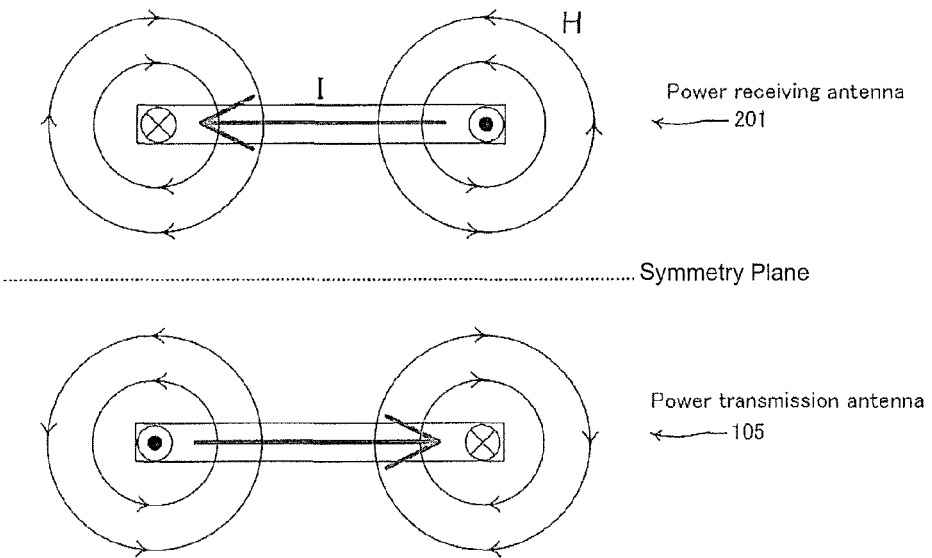
FIG. 11 is a schematic diagram showing the state of current and electric fields at a second extreme-value frequency.

FIG. 11 is a schematic diagram showing the state of current and electric fields at a second extreme-value frequency. At the second extreme-value frequency, the phase of current flowing through the coil of the power transmission antenna 140 is substantially opposite to the phase of current flowing through the coil of the power receiving antenna 210. The vectors of magnetic fields are aligned at around the symmetry plane of the coil of the power transmission antenna 140 and of the coil of the power receiving antenna 210. This state is regarded as generating an electric wall whose magnetic field is horizontal to the symmetry plane located between the power transmission antenna 140 and the power receiving antenna 210.

As for the concept of the electric and magnetic walls and other things described above, what is described in the following documents and the like is adopted herein: Takehiro Imura, Youichi Hori, "Transmission technology with electromagnetic field resonant coupling", IEEJ Journal, Vol. 129, No. 7, 2009, and Takehiro Imura, Hiroyuki Okabe, Toshiyuki Uchida, Youichi Hori, "Research on magnetic field coupling and electric field coupling of non-contact power transmission in terms of equivalent circuits", IEEJ Trans. IA, Vol. 130, No. 1, 2010.

In the case of the present invention, the following describes the reason why an extreme-value frequency at which an electric wall is generated at a symmetry plane between the power transmission antenna 140 and the power receiving antenna 210 is selected when there are two frequencies, i.e., the first and second extreme-value frequencies, as frequencies giving extreme-values.

Figure 12:
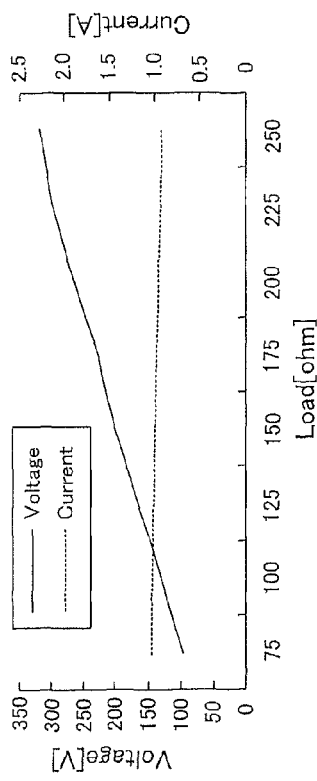
FIG. 12 is a diagram showing characteristics at an extreme-value frequency (first frequency) at which a magnetic wall emerges, among the extreme-value frequencies that give two extreme values.
Figure 12:
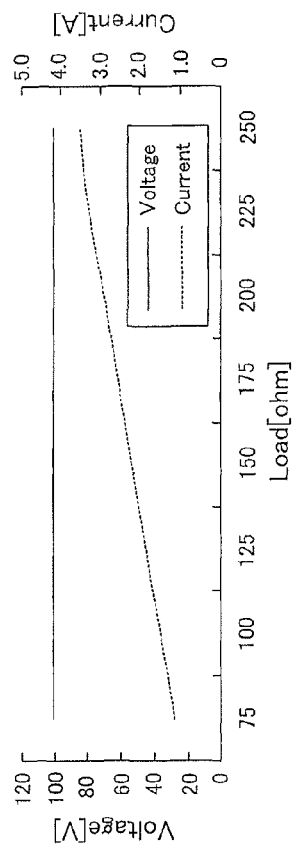

FIG. 12 is a diagram showing characteristics at an extreme-value frequency (first frequency) at which a magnetic wall emerges, among the extreme-value frequencies that give two extreme values. FIG. 12 (A) is a diagram showing how voltage ($V_1$) and current ($I_1$) vary at the power transmission side when a change or variation of the load of the battery 240 (load) occurs. FIG. 12(B) is a diagram showing how voltage ($V_3$) and current ($I_3$) vary at the power receiving side when a change or variation of the load of the battery 240 (load) occurs. According to the characteristics shown in FIG. 12, as the load of the battery 240 (load) at the power receiving side increases, the voltage rises.

At the above-described frequency at which the magnetic wall emerges, when seen from the battery 240's side, the power receiving antenna 210 seems like a constant current source. At the frequency at which the power receiving antenna 210 works like a constant current source, if an emergency stop occurs due to trouble of the battery 240 or the like at the load side when the transmission of power is performed, the voltages of both end portions of the power receiving antenna 210 will rise.

Figure 13:
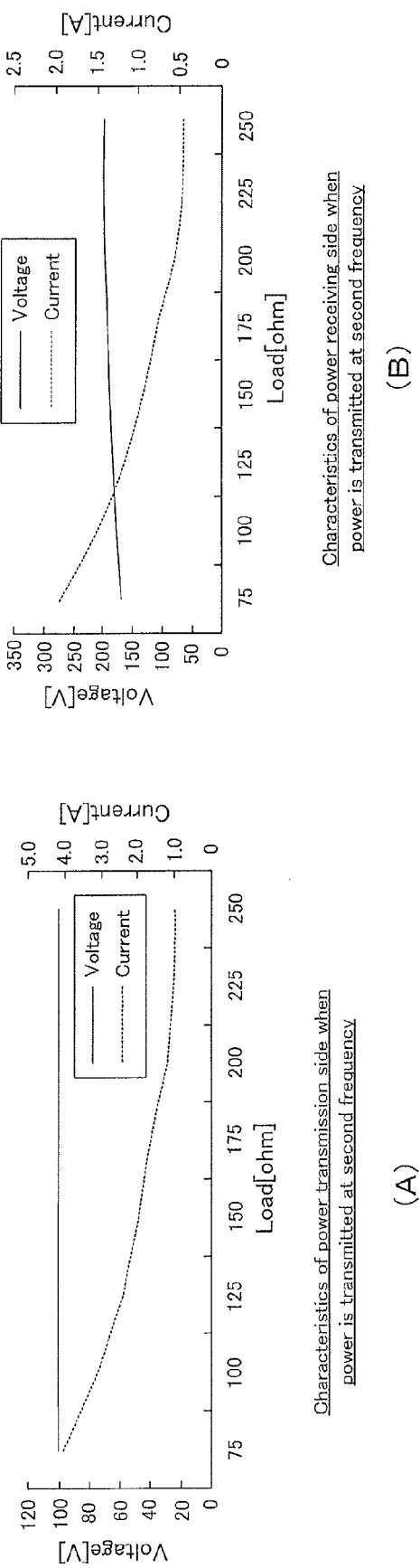
FIG. 13 is a diagram showing characteristics at an extreme-value frequency (second frequency) at which an electric wall emerges, among the extreme-value frequencies that give two extreme values.

FIG. 13 is a diagram showing characteristics at an extreme-value frequency (second frequency) at which an electric wall emerges, among the extreme-value frequencies that give two extreme values. FIG. 13(A) is a diagram showing how voltage ($V_1$) and current ($I_1$) vary at the power transmission side when a change or variation of the load of the battery 240 (load) occurs. FIG. 13(B) is a diagram showing how voltage ($V_3$) and current ($I_3$) vary at the power receiving side when a change or variation of the load of the battery 240 (load) occurs. According to the characteristics shown in FIG. 13, as the load of the battery 240 (load) at the power receiving side increases, the current decreases.

At the above-described frequency at which the electric wall emerges, when seen from the battery 240's side, the power receiving antenna 210 seems like a constant voltage source. At the frequency at which the power receiving antenna 210 works like a constant voltage source, if an emergency stop occurs due to trouble of the battery 240 or the like at the load side when the transmission of power is performed, the voltages of both end portions of the power receiving antenna 210 will not rise. Therefore, in the electric power transmission system of the present invention, the voltage does not rise to a high level when the load plunges; the transmission of electric power can be performed in a stable manner.

According to the characteristics of FIG. 12, to the power receiving-side battery 240 (load), the charging circuit seems like a current source. According to the characteristics of FIG. 13, to the power receiving-side battery 240 (load), the charging circuit seems like a voltage source. As the load increases, the characteristics of FIG. 13 are more preferred for the battery 240 (load) because the current decreases. Therefore, according to the present embodiment, when there are two frequencies, i.e., the first and second extreme-value frequencies, an extreme-value frequency at which an electric wall emerges at the symmetry plane between the power transmission antenna 140 and the power receiving antenna 210 is selected.

Even when there are two frequencies that give extreme values of transmission efficiency, the above electric power transmission system of the present invention can quickly determine an optimum frequency for the transmission of electric power, and therefore can perform the transmission of electric power efficiently and in a short time.

If there are two frequencies that give two extreme values, and if an extreme-value frequency at which an electric wall emerges at the symmetry plane between the power transmission antenna 140 and the power receiving antenna 210 is selected, to the battery 240 (load), the charging circuit seems like a voltage source. Therefore, the advantage is that, as the output to the battery 240 changes due to charging control, the output of the inverter unit 130 rises or falls accordingly, and therefore it is easy to handle. Moreover, when an emergency shutdown of the power receiving-side control unit 250 occurs, the power to be supplied is automatically minimized. Therefore, there is no need for additional equipment.

If there are two frequencies that give two extreme values, and if an extreme-value frequency at which an electric wall emerges at the symmetry plane between the power transmission antenna 140 and the power receiving antenna 210 is selected, to the power receiving-side control unit 250, the rectifying unit 220 seems like a voltage source. Therefore, the advantage is that, as the output to the battery 240 changes due to charging control, the output of the step-up and step-down unit 120 rises or falls accordingly, and therefore it is easy to handle.

If there are two frequencies that give two extreme values, and if an extreme-value frequency at which a magnetic wall emerges at the symmetry plane between the power transmission antenna 140 and the power receiving antenna 210 is selected, it is necessary to control the supplied power when the output is lowered by the power receiving-side control unit 250. In this case, a communication means and a detection means are required, leading to an increase in cost.

However, the frequency control method of the inverter unit of the electric power transmission system of the present invention is available for both the case where an extreme-value frequency at which an electric wall emerges at the symmetry plane between the power transmission antenna 140 and the power receiving antenna 210 for two extreme values is selected and the case where an extreme-value frequency at which a magnetic wall emerges is selected. Furthermore, the frequency control method may be effectively available for the case where only one extreme value exists at around a resonance point.

INDUSTRIAL APPLICABILITY

The electric power transmission system of the present invention is suitably used in a magnetic resonance-type wireless electric power transmission system that charges vehicles, such as electric vehicles (EV) or hybrid electric vehicles (HEV), which have rapidly become popular in recent years. In the magnetic resonance-type wireless electric power transmission system, the problem is that complex circuits and the like are required to determine an optimum frequency for actual transmission of charging power by sweeping frequencies before the transmission of electric power takes place, contributing to an increase in costs of the system. In the electric power transmission system of the present invention, the power transmission-side system controls in such a way as to keep the drive frequency of the inverter unit at a predetermined frequency; the power receiving-side system charges the battery with maximum efficiency. In this manner, the electric power transmission system controls in such a way that the drive frequency of the inverter unit remains unchanged regardless of the coupling coefficient between the power transmission antenna and the power receiving antenna. As a result, the transmission of electric power can be performed under an optimum load condition corresponding to a positional change between the power transmission antenna and the power receiving antenna. Moreover, there is no need for complex circuits that determine an optimum frequency for actual transmission of charging power by sweeping frequencies. Therefore, the system can be built at low cost. Thus, industrial applicability is very high.

EXPLANATION OF REFERENCE SYMBOLS

100: Electric power transmission system
110: Rectifying unit
120: Step-up and step-down unit
130: Inverter unit
140: Power transmission antenna
150: Power transmission-side control unit
170: Communication unit
210: Power receiving antenna
220: Rectifying unit
230: Step-up and step-down unit
240: Battery
250: Power receiving-side control unit
270: Communication unit

The invention claimed is:

1. An electric power transmission system that transmits electric energy via an electromagnetic field from a power transmission antenna to a power receiving antenna, comprising:
    an inverter unit that converts DC voltage to AC voltage of a predetermined frequency to output;
    a power transmission-side control unit that controls a drive frequency of the inverter unit and a voltage value of DC voltage input to the inverter unit, and controls power output from the inverter unit;
    the power transmission antenna to which AC voltage is input from the inverter unit;
    a rectifying unit that rectifies an output of the power receiving antenna to obtain DC voltage, and outputs the DC voltage;
    a step-up and step-down unit that steps up or down DC voltage output from the rectifying unit to output;
    a battery that is charged with an output of the step-up and step-down unit; and
    a power receiving-side control unit that controls the step-up and step-down unit in such a way as to charge the battery with maximum efficiency, and thereby controls in such a way that the drive frequency of the inverter unit remains unchanged regardless of a coupling coefficient between the power transmission antenna and the power receiving antenna.

2. The electric power transmission system according to claim 1, wherein:
    the power transmission-side control unit controls in such a way as to keep the drive frequency of the inverter unit at a predetermined frequency; and the power receiving-side control unit controls the step-up and step-down unit in such a way as to charge the battery with a maximum power value.

3. The electric power transmission system according to claim 1, wherein
as the drive frequency of the inverter unit, a higher extreme-value frequency is used out of two extreme-value frequencies.

4. The electric power transmission system according to claim 2, wherein
as the drive frequency of the inverter unit, a higher extreme-value frequency is used out of two extreme-value frequencies.

* * * * *